United States Patent

[11] 3,595,001

[72] Inventor Samuel O. Shumaker
Royal Ambassador, Apt. 1205, 3700 Galt Ocean Drive, Fort Lauderdale, Fla. 33308
[21] Appl. No. 780,386
[22] Filed Dec. 2, 1968
[45] Patented July 27, 1971

[54] FRUITPICKER
9 Claims, 5 Drawing Figs.

[52] U.S. Cl. .................................................. 56/338,
182/15, 182/17, 182/194
[51] Int. Cl. ........................................................ A01g 19/08
[50] Field of Search ...................................... 56/329,
332—339, 340; 193/7; 182/12—17, 89, 111, 194, 49

[56] References Cited
UNITED STATES PATENTS

| | | | |
|---|---|---|---|
| 289,942 | 12/1883 | Titus | 193/7 |
| 459,660 | 9/1891 | Smith | 56/335 |
| 469,534 | 2/1892 | Bennett | 182/16 |
| 592,133 | 10/1897 | Davis | 193/7 |
| 681,203 | 8/1901 | Eddy | 56/337 |
| 815,660 | 3/1906 | Uthus | 56/337 |
| 852,082 | 4/1907 | Smith | 193/7 |
| 1,094,263 | 4/1914 | Stevens | 56/334 |
| 1,133,381 | 3/1915 | Kellogg | 56/334 |
| 1,152,331 | 8/1915 | Mahoney | 56/335 |
| 1,166,586 | 1/1916 | Garrison | 56/336 |
| 1,214,450 | 1/1917 | Gifford | 56/337 |
| 1,339,338 | 5/1920 | Hickok | 56/329 X |
| 1,362,944 | 12/1920 | Kirby | 56/329 UX |
| 1,626,402 | 4/1927 | Fryman | 56/334 |
| 2,503,626 | 4/1950 | Mayberry | 182/111 X |
| 2,746,232 | 5/1956 | Ossino | 56/336 |
| 3,283,851 | 11/1966 | Smith | 182/15 |

FOREIGN PATENTS

| | | | |
|---|---|---|---|
| 795,910 | 3/1936 | France | 56/337 |
| 81,192 | 5/1895 | Germany | 182/16 |
| 101,103 | 9/1923 | Switzerland | 56/336 |

Primary Examiner—Louis G. Mancene
Assistant Examiner—J. A. Oliff
Attorney—Morton C. Jacobs ABSTRACT: A fruitpicker which can be mounted on one arm and operated by the hand of that arm at a faster than customary speed, and which is especially useful for picking citrus fruit, has an Y-shaped framework the upper end of which carries a cuplike fruit-receiving head adapted to embrace a piece of fruit having a stem by which the fruit is attached to its tree. The head has a slot in which the stem is confined once the fruit to be severed is within the head. A normally retracted, slidable cutter blade, positioned on the head to be slidable across the slot to cut through the fruit stem, is actuable by a cable running down along the framework to an operating trigger on the framework and accessible to the hand of the user. Attached to the lower end of the framework is a ring through which the user can insert the arm of that hand for mounting and steadying the picker.

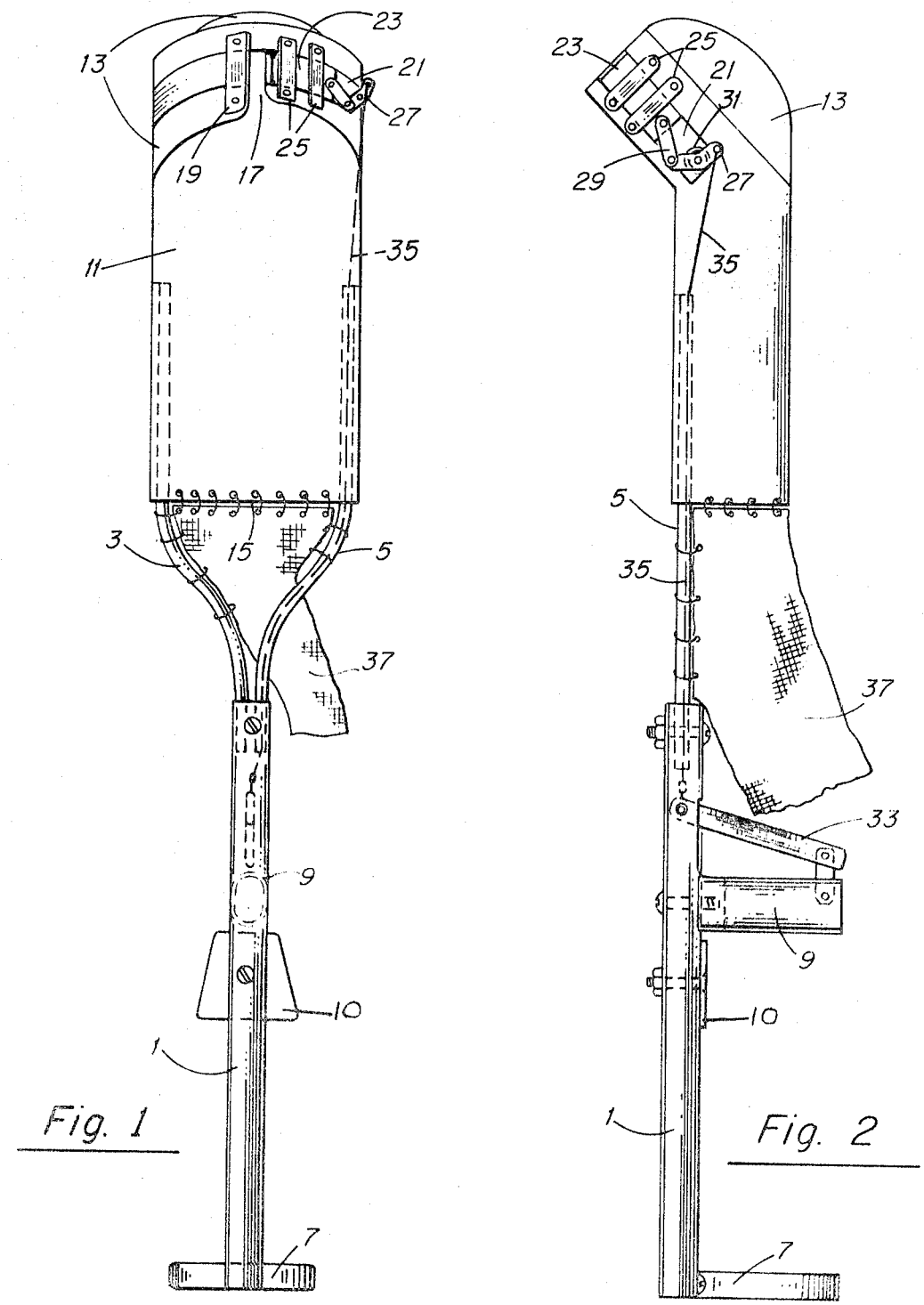

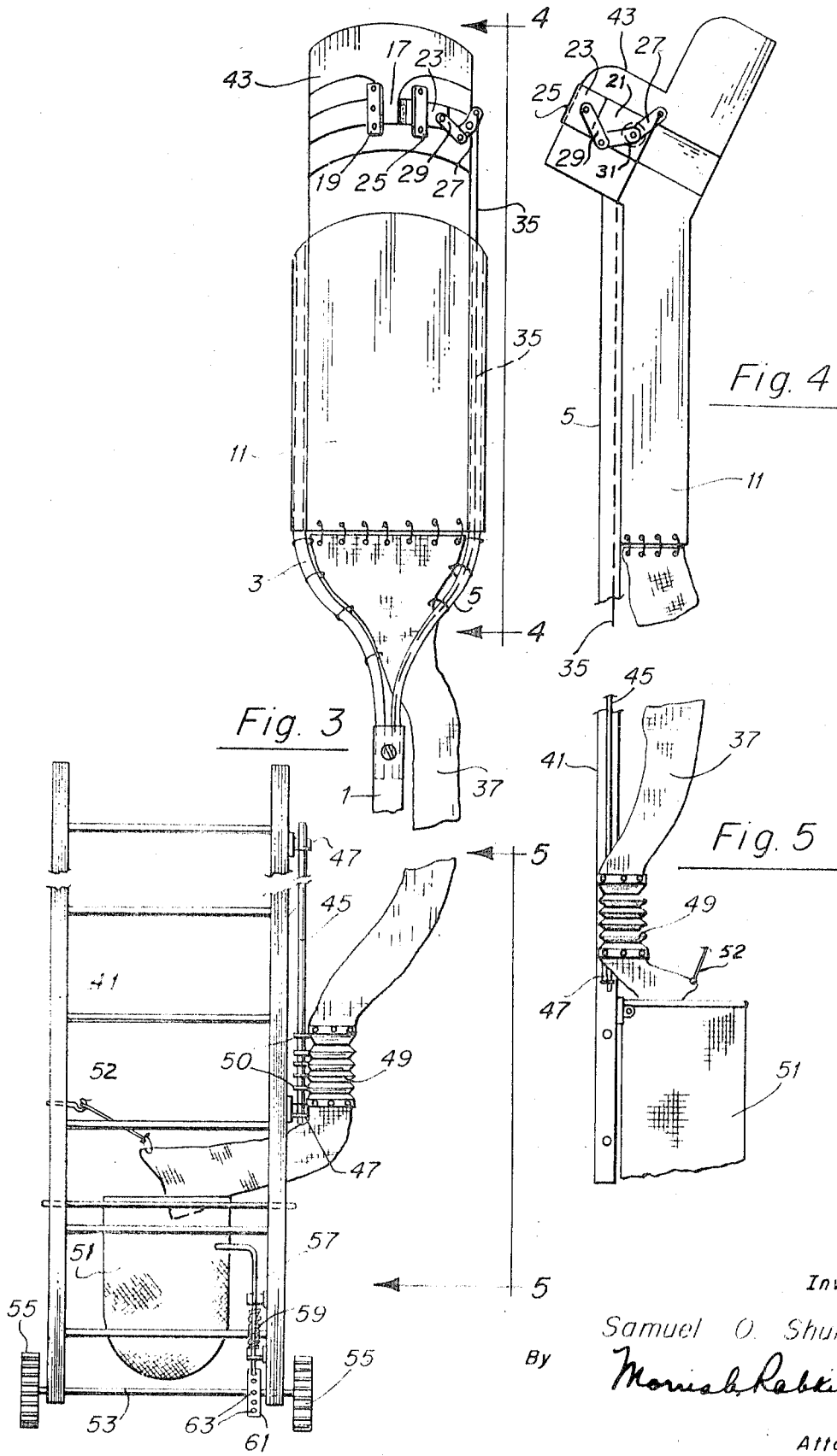

FRUITPICKER

This invention relates to a fruitpicker for picking fruit grown on trees, and particularly to a hand-operable picker suitable for severing various fruits, among them citrus fruits such as oranges, grapefruit and lemons, from the trees on which they are grown and delivering them to a receptacle in which they are collected.

Many forms of fruitpickers of this type have been designed heretofore, but known fruitpickers have various disadvantages. Some, for example, are heavy and bulky and difficult both to hold and to maneuver among the branches of a tree. Many such fruitpickers have been found also to bruise or otherwise damage the fruit being picked and/or the branches on which they have grown. Among the previously known fruitpickers are some which sever the fruit by cutting through the stems thereof while others require either that the grasped fruit be pulled off from the branches, or that the branches be shaken to loosen the fruit. In the latter cases, much of the fruit usually falls to the ground and is lost. Furthermore, many fruitpickers heretofore provided require the use of both hands, and this usually slows down the picking operation. Still other pickers must be handled very carefully to avoid bruising such table fruits as apples, pears, peaches and the like. However, in those cases where the fruit is grown primarily to provide juice, it is not so important to make sure that the fruit is not bruised during picking. It is to the latter class of fruit that the present invention is primarily directed, though it is also useful for picking other fruits as well.

The primary object of this invention is to provide an improved fruitpicker of the type set forth which is free of the above-noted disadvantages.

More particularly, it is an object of this invention to provide an improved fruitpicker which cuts through the stem of the fruit in order to sever it from its branch and which does so with a clean cut.

Another object of this invention is to provide an improved fruitpicker which is light in weight and which can be supported easily on one arm, whereby the user can pick more fruit in a given time than can be picked with prior art pickers requiring the use of both hands.

Still another object of this invention is to provide an improved fruitpicker as aforesaid which will not bruise or otherwise damage either the fruit being picked of the branches from which the fruit is suspended.

Yet another object of this invention is to provide an improved fruitpicker as aforesaid which is easy to manipulate among and around branches of a tree.

A further object of this invention is to provide an improved fruitpicker as described above which can reach to the top of the average-sized tree while the user is standing on the ground, or which can be mounted alongside a special ladder to enable the user to reach the higher branches of taller trees.

It is also an object of this invention to provide an improved fruitpicker of the type set forth which is compact in structure, relatively light in weight, easy to manufacture, inexpensive in cost, and highly efficient in use.

According to this invention, the picker has an essentially Y-shaped framework, preferably of lightweight, tubular stock, carrying a cuplike fruit-receiving head at its upper end. The head has a slot in which the stem of the fruit can be captured as the head is applied to it. Extending across the slot is a fixed blade; and a second, normally spring-retracted, movable blade is mounted on the head for movement toward and away from the fixed blade. Movement of the movable blade is accomplished by operating a bellcrank coupled to the movable blade. Attached to the lower end of the framework is a ring through which the user can extend his forearm for supporting the picker. Near the ring, the framework carries a handle on which a trigger is pivoted. A flexible cable is connected at one end to the aforesaid bellcrank and at its other end to the trigger. Thus, by pressing on the trigger after a fruit has been received in the head cup and the stem thereof captured in the slot, the pulled cable will cause the movable blade to cut through the stem and thus sever the fruit which thereupon slides down through the head and thence along a sleeve connected to the head and leading to a collecting receptacle. To render the picker thus far described useful for tall trees, it can be mounted on a special ladder along which the user can climb to a desired height, and on which the fruit-receiving container is mounted.

The novel features of this invention, both as to its structure and manner of operation, as well as additional objects and advantages thereof, will be understood more readily from the following description, when read in connection with the accompanying drawings in which FIG. 1 is a front elevation of one form of fruitpicker in accordance with the present invention, FIG. 2 is a side elevation thereof as seen from the right of FIG. 1, FIG. 3 is a view similar to FIG. 1 showing a somewhat modified form of picker mounted on a ladder, FIG. 4 is a fragmentary side elevation of the upper part of the picker of FIG. 3 as viewed in the direction of the arrows 4–4 of FIG. 3, and FIG. 5 is a fragmentary side elevation of the lower end of the picker of FIG. 3 and part of the ladder, all as viewed in the direction of the arrows 5–5 of FIG. 3.

Referring more particularly to FIGS. 1 and 2 of the drawings, there is shown a fruitpicker comprising a substantially Y-shaped framework having a vertical pole portion 1 preferably of lightweight, tubular stock, such as aluminum. Mounted on the upper end of the pole portion 1 are a pair of spaced-apart, upper portions or arms 3 and 5 of the Y-framework, the arms 3 and 5 being also preferably of lightweight, tubular stock. Secured to the lower end of the pole portion 1 is a ring 7 through which a user can insert a hand and its forearm freely and without substantial impediment for supporting and steadying the picker. Between the ring 7 and the arms 3 and 5, there is mounted, in a position easily accessible to the mentioned hand, a handle 9 which can be grasped by the hand to further steady the picker.

Mounted on the arms 3 and 5 is a fruit-receiving head 11 the upper end 13 of which is of inverted cuplike form, as best seen in FIG. 2, and the lower end 15 of which is open. The cup 13 is of such size and shape as to readily fit around a piece of fruit up to, say, 6 inches in diameter. It has a slot 17 in which the stem of the fruit can be received and captured. A fixed blade 19 is mounted on the cup 13 with its knife edge extending slightly over the slot 17. The cup 13 also has a channel 21 leading to the slot 17 and in which is slidably mounted a movable blade 23. A pair of metal straps 25 hold the blade 23 in the channel 21.

Pivotally mounted on the cup 13 near the channel 21 is a bellcrank 27 one end of which is coupled to the movable blade 23 by a link 29. A spring 31 on the pivot shaft of the bellcrank 21 constantly urges the bellcrank counter clockwise (as seen in FIG. 2) to hold the blade 23 in its retracted, rest position removed from the slot 17. Thus, once the cup embraces a piece of fruit from the top, its stem is free to enter the slot 17 after which the blade 23 is moved across the slot 17 toward the fixed blade 19 to cut through the stem and thus sever the fruit from its branch.

For moving the blade 23 across the slot 17, there is provided a trigger 33 which is pivotally carried by the handle 9 and which extends into the hollow pole 1, as can be seen in FIG. 2. Connected to the free end of the trigger 33 is a cable 35 which extends up through the pole 1 and the arm 5 to the bellcrank 27 to one arm of which the cable is also connected. Thus, the trigger 33 is coupled to the blade 23 for actuating the latter. In addition, there is connected to the lower end of the head 11 a chute 37 of canvas, nylon, or the like which leads to a suitable receptacle (not shown) that may be suspended from a shoulder of the user, for example, and serves to collect the severed fruit.

When the picker is to be used, the user slips one arm through the ring 7, takes hold of the pole 1 and raises the picker to a suspended fruit. He then manipulates the picker to place the cup over the fruit and brings the cup down around the fruit to embrace it with its stem in the slot 17. When the stem is thus confined, the user presses down on the trigger 33 to cause the blade 23 to slide over across the slot 17 toward the fixed blade 19. In moving across the slot 17, either the blade 23 alone will cut through the stem, or the blades 19 and 23, acting jointly, will cut the stem and sever the fruit from its branch. The severed fruit will then fall down through the chute 37 into the collecting receptacle.

The form of picker thus far described can be used efficiently for trees of average height (say, about 14 feet) while the user is standing on the ground. For taller trees, a somewhat modified form of picker such as shown in FIGS. 3—5, in combination with a ladder 41, is useful. The picker itself is generally similar to that of FIGS. 1 and 2, the latter of which can also be used with the ladder. However, the pole 1 may be made short to provide a handle and is normally slipped over the upper end of one side of the ladder as can be seen in FIG. 3. Also, the upper end 43 of the head 11 is open to permit slipping the head around the fruit from below it, rather than downwardly from above it, as in the case of the picker of FIGS. 1 and 2. The same side of the ladder is provided with a rod 45 between a pair of brackets 47, and the chute, in this case formed with a bellows section 49 so as to be extensible, is run down along the same side of the ladder. A plurality of rings 50, slidable on the rod 45 and connected to the chute 37, keep the chute alongside the ladder while permitting the bellows to stretch. The lower end of the chute 37 terminates above a receptacle 51 in which severed fruit is collected and is suspended from a hook 52 on the opposite side of the ladder. The ladder itself is mounted on an axle 53 to which are fixed a pair of ground wheels 55. Also mounted on the ladder is a slidable rod 57 which is normally held lowered by a spring 59 in locking engagement with a wheel 61 that is also fixed to the axle 53 and which has a series of holes 63 in its periphery. The lower end of the rod 57 can be inserted into any one of the holes 63 to lock the axle 53 against rotation. The rod 57 may be pulled up out of the engaged hole 63 to release the axle 53 and the wheels 55 for rotation. In using this form of picker, the ladder, with the picker mounted on it, is wheeled over to and leaned against a tree. The user then locks the ladder in place by releasing the rod 57. He then climbs up to a suitable rung, takes hold of the pole or handle portion 1, and raises the head 11 to a desired height to bring the head under a selected piece of fruit. He thereupon slips the head up around the fruit from underneath and proceeds to cut through its stem to sever the fruit from the tree, whereupon the severed fruit slides down along the chute to the receptacle 51.

From the foregoing description, it will be apparent that pickers according to the present invention are light in weight, easy to manipulate and operate even with one hand while leaving the other hand free to also pluck additional fruit, if desired, or for holding onto the ladder, and which are highly efficient in use. Of course, there are various changes and modifications that can be made, all coming within the spirit of this invention. For example, instead of providing the picker with the fixed blade 19, it may be provided with a solid block or anvil of soft aluminum or the like against which the movable blade may engage. In any case, the fruit stem will be cut clean with only a short stem left on the severed fruit. Also, since electric wires sometimes pass through trees, the metal parts, such as the framework 1, 3, 5, the ring 7, etc., may be encased in rubber or plastic insulator. Other changes of similar nature may also be made. It is to be understood, therefore, that the foregoing description is intended to be merely illustrative and not in a limiting sense.

What I claim is:

1. A fruitpicker for severing from a tree fruit connected thereto by a stem, said picker comprising a lightweight elongated framework, a ringed member attached to said framework adjacent the lower end thereof for receiving a forearm of a user, a fruit-receiving head at the upper end of said framework, said head having a slot in which the fruit stem can be captured when the fruit is received in said head, a knife blade movably mounted on said head for movement between a rest position and a cutting position over said slot for cutting through said captured stem and thus severing the fruit from its tree, means on said framework for receiving fruit cut at said slot and for guiding the fruit downwards, a handle attached to said framework at an intermediate portion thereof so as to be held by the user's hand with the associated forearm encircled by said ringed member for supporting said framework, a trigger connected to said framework accessible to and operable by the hand of said forearm, and means coupling said blade to said trigger for moving said blade into said stem-cutting position upon actuation of said trigger, whereby said fruitpicker is supportable by one arm and the associated hand of the user and operable by said associated hand for cutting fruit at remote distances and guiding the picked fruit downwards.

2. A fruitpicker according to claim 1 wherein said head is cuplike in form said head having a channel leading to said slot, and said blade being slidable in said channel.

3. A fruitpicker according to claim 1 characterized by said trigger being pivotally mounted on said handle.

4. A fruitpicker according to claim 1 wherein said framework is made of tubular stock, and wherein said coupling means includes a cable that extends down from said head through said tubular framework along one side thereof.

5. A fruitpicker according to claim 1 characterized by the addition of a second, fixed blade along an edge of said slot for cooperation with said movable blade.

6. A fruitpicker according to claim 1 characterized by said guiding means including a chute connected to the lower end of said head and leading down to a fruit-collecting receptacle.

7. A fruitpicker according to claim 1 wherein said framework is substantially Y-shaped in form and has a pole portion topped by a pair of diverging, upper arms, and wherein said head is mounted on said upper arms of said Y-shaped framework.

8. A fruitpicker according to claim 1 wherein said fruit-receiving head has a generally closed, rounded surface at its upper end, whereby said head can be readily moved upwardly through the branches of a tree.

9. A fruitpicker according to claim 8 wherein said slot of said fruit-receiving head is located to one side of said head and opens in a downward direction to capture a fruit stem by downward movement of said head.